(12) United States Patent
Deshpande

(10) Patent No.: US 7,171,444 B2
(45) Date of Patent: Jan. 30, 2007

(54) REMOTE DESKTOP PROTOCOL COMPRESSION SYSTEM

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 756 days.

(21) Appl. No.: 10/003,531

(22) Filed: Nov. 14, 2001

(65) Prior Publication Data

US 2003/0093568 A1 May 15, 2003

(51) Int. Cl.
*G06F 15/16* (2006.01)
*G06K 9/36* (2006.01)
*G06K 9/46* (2006.01)

(52) U.S. Cl. ............... 709/203; 709/208; 382/236; 382/244

(58) Field of Classification Search ............ 709/203, 709/208, 217; 382/244–247, 236
See application file for complete search history.

(56) References Cited

U.S. PATENT DOCUMENTS

| | | | | |
|---|---|---|---|---|
| 4,316,222 A | * | 2/1982 | Subramaniam | 358/426.13 |
| 4,910,784 A | * | 3/1990 | Doddington et al. | 704/251 |
| 5,467,134 A | * | 11/1995 | Laney et al. | 348/409.1 |
| 5,515,388 A | * | 5/1996 | Yagasaki | 714/800 |
| 5,563,664 A | * | 10/1996 | Yang et al. | 348/475 |
| 5,583,500 A | * | 12/1996 | Allen et al. | 341/107 |
| 5,740,283 A | * | 4/1998 | Meeker | 382/248 |
| 5,742,728 A | * | 4/1998 | Yanagihara et al. | 386/68 |
| 5,751,858 A | * | 5/1998 | Sugiyama et al. | 382/236 |
| 5,818,877 A | * | 10/1998 | Tsai et al. | 375/241 |
| 5,864,711 A | * | 1/1999 | Mairs et al. | 710/6 |
| 5,911,008 A | * | 6/1999 | Niikura et al. | 382/236 |
| 5,990,955 A | * | 11/1999 | Koz | 375/240.01 |
| 6,008,847 A | * | 12/1999 | Bauchspies | 375/240.01 |
| 6,014,694 A | * | 1/2000 | Aharoni et al. | 709/219 |
| 6,057,857 A | * | 5/2000 | Bloomfield | 345/441 |
| 6,058,219 A | * | 5/2000 | Partridge | 382/259 |

(Continued)

OTHER PUBLICATIONS

IPC Corporation. WinConnect Press release. Released Oct. 24, 2001, <http://www.ipc.com.sg/press/24102001_WinConnect.htm>, 3 pages.*

(Continued)

*Primary Examiner*—Jeffrey Pwu
*Assistant Examiner*—George C. Neurauter, Jr.
(74) *Attorney, Agent, or Firm*—Marger Johnson & McCollom P.C.

(57) ABSTRACT

Embodiments of the present invention are directed to a remote desktop communication protocol that includes spatial and temporal compression techniques. Multimedia presentation data is generated at a server from a source. A compression facility modifies the presentation data by both spatially and temporally compressing the presentation data to transmittable data. In some embodiments, a check is performed to ensure that the least amount of data is selected prior to sending the transmittable data to a remote client. The remote client receives the transmittable data and re-constructs the original multimedia presentation data. In some embodiments that use lossy compression, the reconstruction may not exactly re-construct the original multimedia presentation data. Once re-created, the remote client presents the presentation data at the remote client. The presentation data could be audio, video, or other data or a combination of them.

36 Claims, 10 Drawing Sheets

U.S. PATENT DOCUMENTS

| | | | | |
|---|---|---|---|---|
| 6,081,623 | A * | 6/2000 | Bloomfield et al. | 382/239 |
| 6,085,247 | A * | 7/2000 | Parsons et al. | 709/227 |
| 6,091,412 | A | 7/2000 | Simonoff et al. | 345/335 |
| 6,091,777 | A * | 7/2000 | Guetz et al. | 375/240.11 |
| 6,112,246 | A | 8/2000 | Horbal et al. | 709/230 |
| 6,118,899 | A * | 9/2000 | Bloomfield et al. | 382/239 |
| 6,130,895 | A * | 10/2000 | Tannhauser | 370/468 |
| 6,148,109 | A * | 11/2000 | Boon et al. | 382/238 |
| 6,161,145 | A | 12/2000 | Bainbridge et al. | 709/246 |
| 6,172,683 | B1 * | 1/2001 | Bloomfield | 345/441 |
| 6,175,861 | B1 | 1/2001 | Williams, Jr. et al. | 709/217 |
| 6,178,457 | B1 | 1/2001 | Pitchford et al. | 709/228 |
| 6,259,810 | B1 * | 7/2001 | Gill et al. | 382/166 |
| 6,263,363 | B1 * | 7/2001 | Rosenblatt et al. | 709/217 |
| 6,301,304 | B1 * | 10/2001 | Jing et al. | 375/240.25 |
| 6,304,928 | B1 * | 10/2001 | Mairs et al. | 710/68 |
| 6,404,932 | B1 * | 6/2002 | Hata et al. | 382/239 |
| 6,538,667 | B1 * | 3/2003 | Duursma et al. | 715/740 |
| 6,633,314 | B1 * | 10/2003 | Tuli | 715/744 |
| 6,687,410 | B1 * | 2/2004 | Brown | 382/239 |
| 6,738,822 | B2 * | 5/2004 | Fukasawa et al. | 709/231 |
| 6,763,501 | B1 * | 7/2004 | Zhu et al. | 715/530 |
| 6,784,855 | B2 * | 8/2004 | Matthews et al. | 345/1.1 |
| 6,842,777 | B1 * | 1/2005 | Tuli | 709/217 |
| 2001/0031089 | A1 * | 10/2001 | Hata et al. | 382/232 |
| 2001/0041011 | A1 * | 11/2001 | Passaggio et al. | 382/232 |
| 2002/0029285 | A1 * | 3/2002 | Collins | 709/232 |
| 2002/0067427 | A1 * | 6/2002 | Klein | 348/409.1 |
| 2002/0090139 | A1 * | 7/2002 | Hata et al. | 382/239 |
| 2002/0131505 | A1 * | 9/2002 | Vidunas | 375/240.19 |

OTHER PUBLICATIONS

Citrix Systems, Inc. "ICA Technical Paper", publicly posted Mar. 16, 1996, <http://web.archive.org/web/19971024035710/http://www.citrix.com/technology/icatech.htm>, 9 pages.*

Microsoft Corporation. "The DVD Playback Function Does Not Work During a Remote Assistance Session", Troubleshooting Article Q302899, released Oct. 18, 2001, 1 page.*

Lee, Oo Gin. "Software gives old PCs new lease of life", Straits Times, Oct. 27, 2001, <http://it.asia1.com.sg/newsdaily/news001_20011027.html>, 2 pages.*

Wiltgen, Charles. "The Quicktime FAQ", version 0.45, Aug. 10, 1995, <fusion.gat.com/docview/images/sample.pdf>, 73 pages.*

Richardson, T. et al. "The RFB Protocol", version 3.3, Jul. 16, 1998, <www.realvnc.com/docs/rfbproto.pdf>, 26 pages.*

DigitalTelevision.com, Inc. "Glossary of Digital Television Terms", publicly posted Sep. 1, 2000, <web.archive.org/web/20000901010524/http://digitaltelevision.com/dtvbook/glossary.shtml>, 52 pages.*

Conklin, G. J. et al. "Video Coding for Streaming Media Delivery on the Internet", IEEE Transactions on Circuits and Systems for Video Technology, vol. 11, No. 3, Mar. 2001, pp. 269-281.*

Richardson, T. et al. "Virtual Network Computing", IEEE Internet Computing, vol. 2, No. 1, Jan./Feb. 1998.*

Microsoft Corp., "Microsoft Windows 2000 Server: Remote Desktop Protocol (RDP) Features and Performance," white paper, Jun. 2000.

Microsoft Corp., "Microsoft Windows NT Server, Terminal Server Edition, version 4.0: An Architectural Overview," Jun. 1998.

* cited by examiner

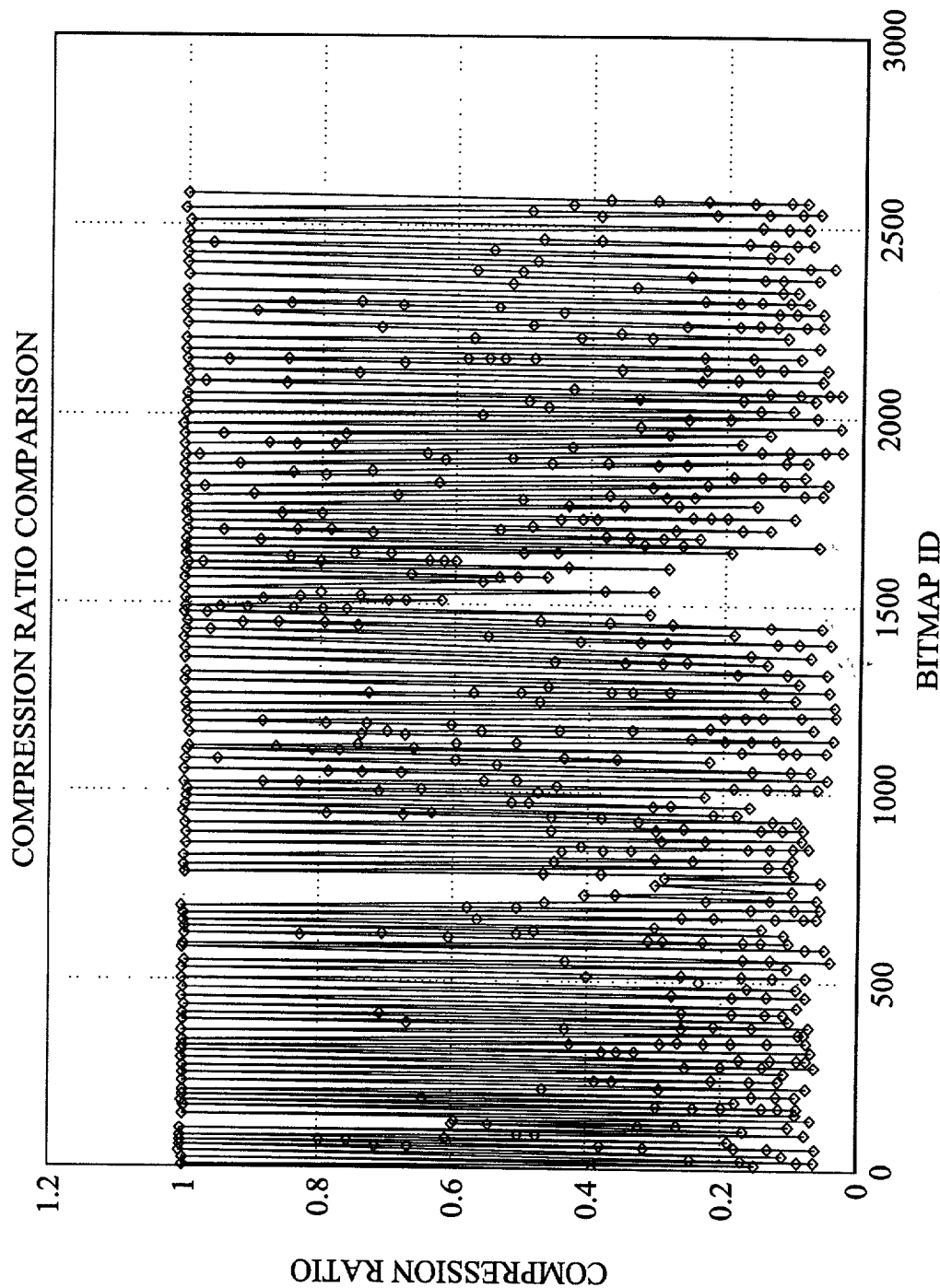

REMOTE DESKTOP PROTOCOL COMPRESSION SYSTEM

TECHNICAL FIELD

This disclosure relates to data transmission and, more particularly, to a data transmission system that uses data compression techniques in a communication link between a server and a thin computer client.

BACKGROUND

Thin clients are computing devices that are connected to a server. In addition to having methods for input and output, thin clients include some limited microprocessor and operating system capability. They are called thin clients because they run "thin" operating systems on their microprocessors, and are not able to implement complex or intensive programs in a timely manner. They are thin compared to "fat" operating systems of a networked or stand-alone computer, which generally has much more processing capability in its microprocessor and operating system.

Normally thin clients include an input device, such as a keyboard and/or mouse, and an output device, such as a display monitor. Depending on what function the thin client serves, these devices could be combined into a single device, such as a touch screen, or may all be separate. Thin clients are typically deployed when the processing power of a typical computer is not necessary, and/or when a less expensive solution will meet requirements of a particular installation.

Functions of the thin client processor include, for example, sensing an input on the input device, communicating the input to the server, receiving codes and data that form an output display image from the server, and causing the output device that is connected to the thin client to display the desired image. Also, at least some memory is usually included in the thin client, for storing data and commands received by the server, for a de-compression work area, and for other uses. Additionally, some sort of long-term storage, such as a hard disk drive, may be present in the thin client.

Thin clients differ from typical standalone or networked computers in that thin clients typically do not run application programs directly on their microprocessors, whereas standalone and networked computers generally do run them. Programs that appear to be running on a thin client actually run on the server to which the thin client is connected. The thin client simply acts as a pass-through, accepting input from the keyboard and/or mouse, passing the input through to the server, and displaying on its screen what the server sends it to display. Typical personal computers in a network setting, conversely, run application programs directly on their own processor.

As an example of this difference between a thin client and a networked computer, consider a word processing application running on both machines. On the networked computer, little or none of the processing necessary to run the application is done on the network server. Keyboard input is detected and processed by the networked computer, data is stored in local memory and probably cached out to a local hard drive, and the display is also controlled locally.

On a thin client, conversely, the actual word processing program runs on the server and the server's memory stores the necessary programs and data. Data that is input on the thin client keyboard is transferred to the server for any necessary operation. The server then decides what the thin client will show on its screen, and sends the exact data and/or commands to the thin client to cause it to show the desired image.

Thin clients communicate with the server through a communication channel. Communication protocols used between thin clients and servers differ from those used between networked computers, in order to take advantage of the special function of the thin client. Communication protocols between the server and the thin client are commonly called remote desktop communication protocols. As used throughout this description, discussion of remote desktop communication protocols means a family of protocols used to communicate between servers and thin clients, or between more than one thin client, and not any one particular protocol. Because bandwidth is usually limited between a thin client and its server, the communication protocols include mechanisms for data compression.

Newer applications require thin clients to display increasingly more complex image displays, such as audio and video applications. A video application can be thought of as a sequence of still pictures that are shown in rapid succession. Because the human eye briefly "retains" a copy of an image it perceives, a series of images is interpreted as a continuous video if the successive frames are shown quickly enough. Normally, humans fail to notice any discontinuity in the video if the successive frame images are shown more than 20 times per second. Typical applications try to show video images at a rate of 30 frames per second, so that no discontinuities are perceived, even if the framerate is somewhat slowed. As imagined, sending a series of pictures to a thin client in order to create a video sequence requires a large amount of data sent from the server.

Although current remote desktop communication protocols include some data compression techniques, these techniques fail to reduce the amount of data sent from the server to a thin client to a level adequate to ensure that video playback on the thin client will operate correctly, given the low bandwidth requirements of the communication link. Adequate playback is achieved when a video is displayed on the thin client without slow screen updates, dropouts, artifacts or other problems that distract the viewer. Many thin client systems fail to achieve adequate playback due to the bandwidth constraints and the way in which that bandwidth is used.

The present invention addresses this and other problems associated with the prior art.

SUMMARY OF THE INVENTION

Embodiments of the present invention are directed to a remote desktop communication protocol that includes spatial and temporal compression techniques, and a system using such protocol. Multimedia presentation data is generated at a server from a source. A compression facility modifies the presentation data by both spatially and temporally compressing the presentation data to transmittable data. In some embodiments, a check is performed to ensure that the least amount of data is selected prior to sending the transmittable data to a remote client. The remote client receives the transmittable data and re-constructs the original multimedia presentation data. In some embodiments that use lossy compression, the reconstruction may not exactly re-construct the original multimedia presentation data. Once re-created, the remote client presents the presentation data at the remote client. The presentation data could be audio, video, or other data or a combination of any or all of them.

One embodiment of the invention includes a server running an application program for generating multimedia data. At the server is a data compressor that takes multimedia data and produces spatially and temporal compressed data. After the compressed data is sent to a thin client, it is decompressed and possibly locally stored, prior to outputting the decompressed data at the thin client. In some embodiments, outputting the data at the thin client includes showing a video clip on a display unit.

BRIEF DESCRIPTION OF THE DRAWINGS

FIG. 9C is a graph showing a compression ratio achieved for the film clip of FIG. 9A by using spatial and temporal compression.

DETAILED DESCRIPTION

Figure 1:
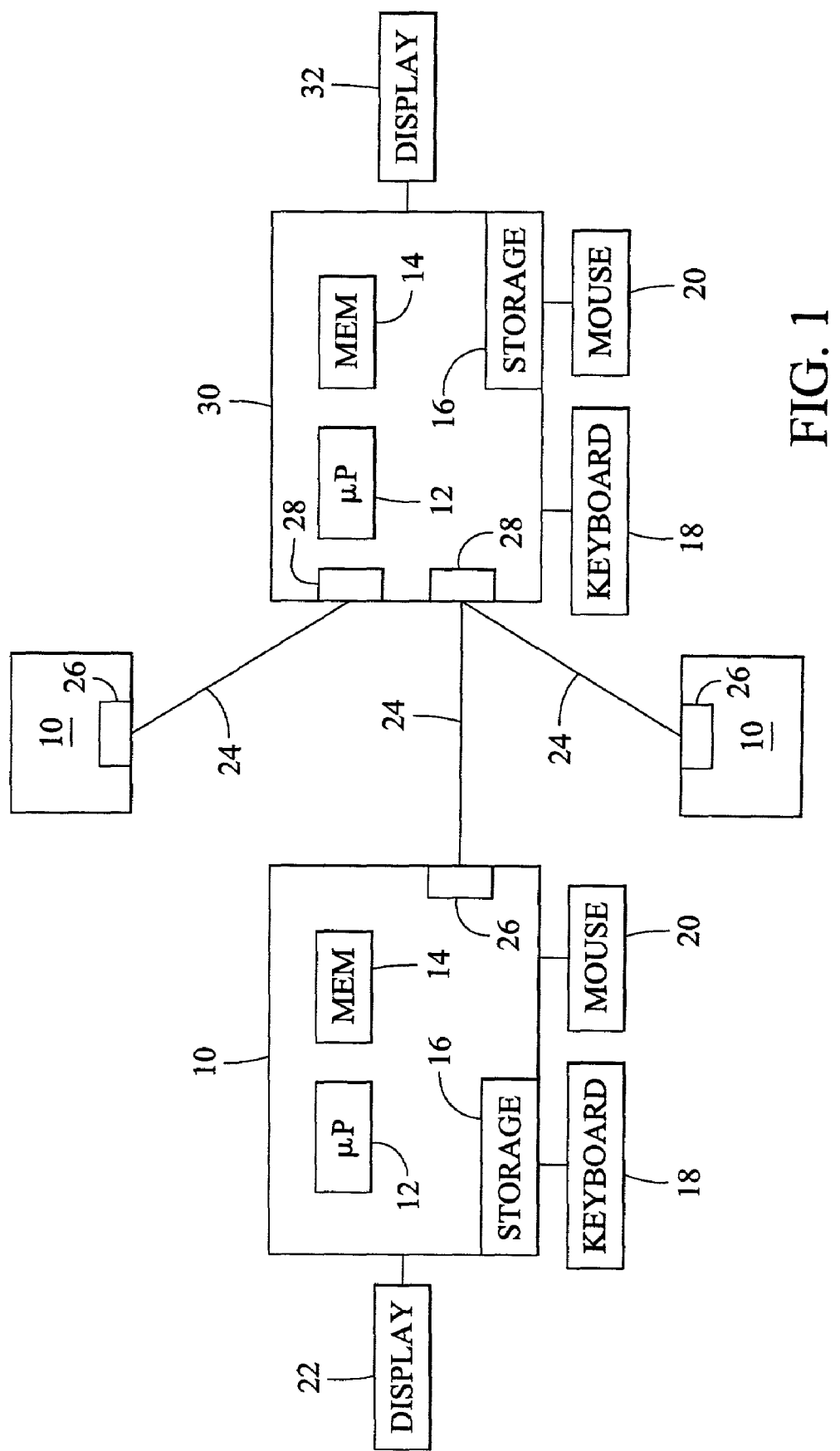
FIG. 1 is a block diagram showing a thin client and a server.

The invention is directed to a system that uses compression techniques in a remote desktop protocol environment, i.e., one in which a server provides display instructions to a thin client over a communication link that uses a remote desktop protocol. This invention operates in remote desktop protocol environments in a general sense, and is not limited to any one particular communication protocol.

Although description is made of a terminal-server system, embodiments of the invention are equally operational in a peer-to-peer system, with each peer alternately or at the same time taking the role of the server and client as described herein. Therefore, although the terms "terminal" and "server" are used for clarification of what machine is doing what operation, and what functions are being performed, the terms do not necessarily describe the type of machines used for performing those functions.

Embodiments of the invention could also be implemented in a multipoint application sharing environment, e.g. using a protocol such as T.128, which is in the family of T.120 protocols for multimedia teleconferencing over multiple thin client or desktop computers. The T.120 protocols, and others like them, are promulgated by the Telecommunication Standardization Sector Group (ITU-T) of the International Multimedia Telecommunications Consortium, Inc. (IMTC).

Embodiments of the invention include a server that communicates with a thin client over a communication link. Data sent over the communication link adheres to remote desktop data protocols so that the thin client and the server can communicate efficiently. Because the server may send a large amount of data to the thin client, such as when sending a video to be displayed on the thin client, the server compresses the data it generates prior to sending it over the communication link to the thin client.

In some embodiments, the server compresses the data both spatially and temporally prior to sending it over the communication link. Spatial compression describes compressing a single image frame into a smaller amount of data than the raw data used to create the original image frame. Spatial compression techniques include searching the raw data for patterns, and then describing those patterns in a way that generates less data that the raw data used to create the original frames. If, for some reason, describing the patterns of the raw data requires more data than the raw data itself, then the raw data continues to be used instead of the spatially "compressed" data.

Temporal compression describes using data found previously in time, for example, in previous image frames, to describe the data of a present or next image frame. Because large parts of a video remain static from one frame to the next, some temporal compression techniques send a signal that the data for that portion of the current frame is the same as in the prior frame. Also, because when a video changes from one frame to the next the changes are typically small, other temporal compression techniques involve sending to the thin client only the changes from the prior frame to the present frame. Coding of these changes can also be compressed prior to sending them to the thin client.

Decompressing the spatially and/or temporally compressed data, after the thin client has received it, is straightforward. The rules that created the compressed data are applied to the compressed data in reverse form, and data that will create a next frame is thereby produced. When a series of frames is created, it can be shown on the thin client as a series of frames, and when the frames are updated quickly enough, the successive frames produce a video.

Searching the raw data to create the patterns stored therein, i.e., compressing the data, nearly always requires more processing power and time than simply decompressing the data. Therefore, more processing power is required to compress and send the data than is required to receive and decompress it. This unevenness is well suited for a server/thin client relationship, in that the strong processing power of a server can be used to create the compressed datastream, while the thin client need only have a relatively low amount of processing power to decompress and display it.

FIG. 1 is a block diagram showing components of an environment in which the invention operates. A thin client terminal 10 includes a microprocessor 12, memory 14 and perhaps a local storage device 16. The thin client 10 accepts input from a keyboard 18, and a mouse 20, and produces an image (or series of images) on a display 22. A server 30 also includes a microprocessor 12, memory 14, and a local storage device 16, although any or all of these devices may be different (typically larger or more capable) than the ones in the thin client 10. The server 30 also has a keyboard 18 and a mouse 20 for input, and a display 32 for producing an output. The server 30 and the thin client 10 are coupled via a communication pipeline 24. The thin client 10 includes a server connection 26, and the server 30 includes one or more thin client connections 28. The server 30 may be coupled to more than one thin client 10 through separate communication pipelines 24, which are coupled to the same or different thin client connections 28, as shown in FIG. 1.

Figure 2:
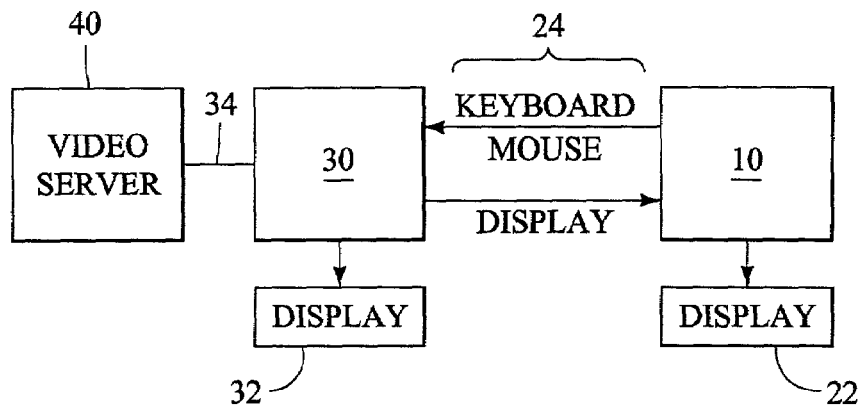
FIG. 2 is a block diagram showing how a thin client and server can interact with a third system.

An example of an operation of the thin client 10 is shown in FIG. 2. In that figure, communication is established between the server 30 and the thin client 10, over the communication pipeline 24. The thin client 10 may include a startup program that initiates communication with the server 30 and then waits for further input, or, the thin client may wait for some input prior to establishing the communication with the server. Once communication is established over the communication pipeline 24, any input sensed by the keyboard 18 or mouse 20 by the thin client 10 is sent to the server 30, typically in encrypted form. The server 30 operates on this input, and generates output commands and data that are sent back to the thin client 10 for an image to be shown on its display 22.

The server 30, in turn, can establish communication with another device, such as a video server 40 to complete the task requested by the thin client 10. Assume, for example, that a user of the thin client 10 wishes to watch a news clip from a news agency such as CNN. Once the thin client 10 and the server 30 are communicating over the communication pipeline 24, the thin client sends keyboard and/or mouse commands to the server indicating the particular video desired to be watched. The server 30 then establishes a connection 34, if not already established, with the video server 40 to download or stream the video clip from the video server. Of course, if the desired video clip was already stored on the server 30 itself, it would not need to communicate with the other device.

Once the video clip is available to the server 30, a video display program, or other suitable process runs on the server. For example, the server 30 may run a standard or streaming video player, flash program, or other application that converts the desired data into a series of images to make frames of a video. Instead of displaying the image on the display 32 of the server 30, however, the server codes the display data and sends it over the communication pipeline 24 with commands to show it on the display 22 of the thin client 10. The display 32 of the server 30 may show an indication that a process is running, and the video that is shown on the display 22 of the thin client 10 may in fact also be shown on the display 32 of the server. But the central focus of the system is to show the desired video on the display 22 of the thin client 10.

Thus, different from a typical standalone or networked computer where the program creating the video runs directly on the device showing the video, in the example shown in FIG. 2, the program that creates the video images is actually running on the server 30, and only the images of the video are shown on the display 22 of the thin client 10.

Returning back to FIG. 1, the server 30 may establish communication with any number of thin clients 10. The thin clients 10 need not be running the same applications or programs as the other thin clients. They may all be running different programs, or may be running the same program in different states of operation. Each thin client 10 is uniquely addressed, so the data sent to and from the thin client can be specific to just that thin client. Or, data may be broadcast to any or all of the thin clients 10 simultaneously. For example, it would be very easy to show the video program in the example given with reference to FIG. 2 simultaneously on all of the thin clients 10 to which the server 30 is connected. In still another embodiment, the thin clients 10 can communicate directly between themselves, without passing through the server 30, where one of the thin clients 10 will take the role of the "server", and the other or others will operate as the clients.

Caching Data on the Thin Client

Because much of the display data sent to the thin client 10 is reused from one frame to another, especially for video playback applications, one effort to reduce the amount of data sent on the communication pipeline 24 is to have the thin client locally store portions of data that make up the frames in the memory 14 of the thin client. As mentioned above, a frame of data is one image that is shown on the display 22 of the thin client 10. A series of frames makes a moving video. Generally, frames have a horizontal size and a vertical size for displaying in a window, and, for a given application, these sizes do not change. Typically these sizes are given in pixels, such as a 176×144 pixel frame, or any other number. The pixel size of the frame may be the size of the entire display 22 of the thin client, or may appear in only a window of the display.

A frame is generally made up of smaller pieces called bitmaps. Bitmaps can be any size, but a common size in remote desktop protocol environments is 64 pixels by 64 pixels. Pixels, in turn, are generally thought of to be the smallest data element in a frame, and are made up of any number of bytes of color data. The most common pixel size is one byte, (made of 8 bits), but pixel sizes of two or three bytes per pixel (16 or 24 bits) are also common.

Figure 3:
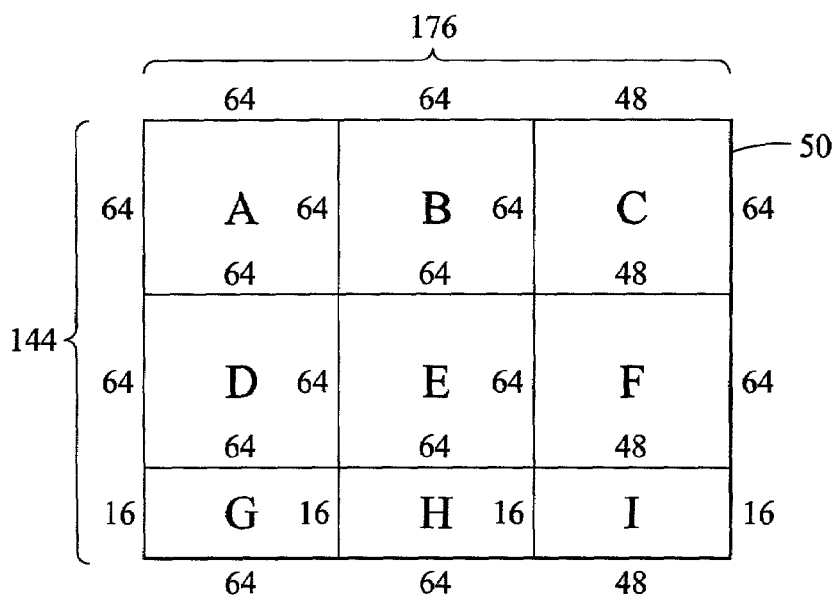
FIG. 3 is a diagram showing how bitmaps are used to create a frame for display on the thin client.

A frame, unless it is larger than the size of the bitmap, is made up of multiple bitmaps. And, if the frame did not easily break up into 64×64 bitmaps, bitmaps other than the standard size would be created. FIG. 3 shows an example of a frame 50, broken into nine bitmaps, labeled A-I. Bitmaps A, B, D, and E are each 64 bits×64 bits. Bitmaps C and F are 48×64. Bitmaps G and H are 64 ×16, and bitmap I is 48×16. The total size of the frame 50 is 176 pixels by 144.

Thin clients 10 can store data locally, either in the memory 14, on the hard drive 16, or a combination of the two. A particular location in the memory 14 oftentimes used for storing data is called a cache. A cache is a portion of memory set aside to temporarily store data that is frequently used. Retrieving data that was temporarily stored in the cache is much faster than having to retrieve the data from the server 30 over the transmission channel 24, or from local storage such as the hard drive 16. Both the thin client 10 and server 30 manage the cache on the thin client. Generally the server 30 instructs the thin client 10 as to what to put in and take out of the cache, and the server also tracks what is in the cache of the thin client.

For example, if the server 30 needs to send a frame to the thin client 10, and four of the nine bitmaps that make up that frame are already stored in the cache of the thin client, then the server would not re-send those four bitmaps to the thin client, but would instead send a signal that directs the thin client to use those bitmaps already stored in its cache.

Figure 4:
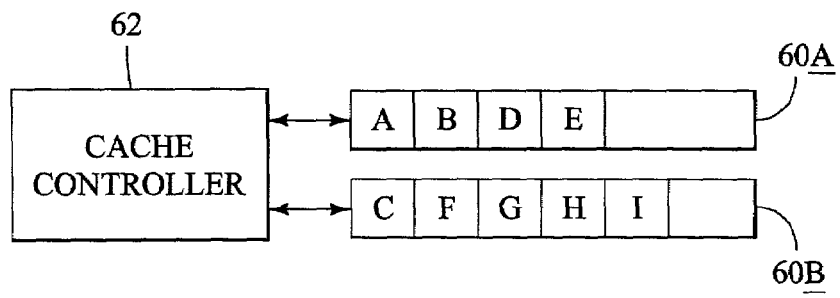
FIG. 4 is a diagram showing a cache system on a thin client.

FIG. 4. shows an example of a cache system on a thin client 10. In that figure there are two caches, 60A and 60B. Of course, there can be any number of caches, and they can be implemented in any configuration. In this example, the cache 60A is used to store standard sized bitmaps, 64×64, while the cache 60B stores non-standard sized bitmaps. A cache controller 62 performs the actual managing of the cache, such as determining where the bitmaps will be stored, and which bitmaps will be deleted from the cache when it is full. The cache controller 62 receives its instructions from the microprocessor 12 of the thin client 10, but those instructions, or others that caused them, come from the server 30. In this description, the caches will be generally referred to as "60", unless distinction between the individual caches 60A and 60B is necessary. When the server 30 wishes to indicate to the thin client 10 that a particular bitmap is in its cache 60, it sends a signal. The signal may be the bitmap name and its cache location, such as "bitmap B, cache 60A", or it could be the cache number and its memory location, such as "Cache 60B, location 2". These examples are just two of the many ways the server could indicate which bitmap was meant, and other methods of cache management are well known in the art.

The bitmaps stored in the caches 60 are not necessarily earmarked for a particular location within a frame, and may in fact be used in any location in any frame if the data contained within the bitmap is desired.

Figure 5A:
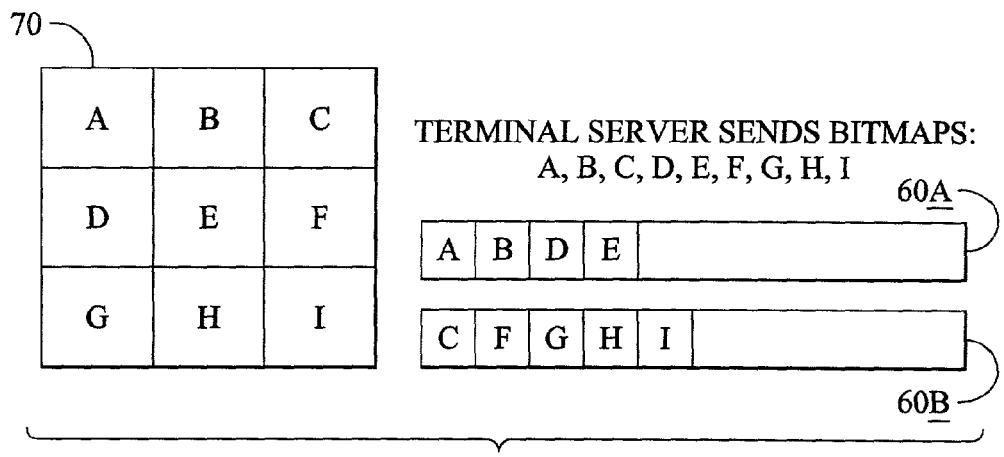
FIGS. 5A, 5B and 5C are diagrams showing an example of caching operation.
Figure 5B:
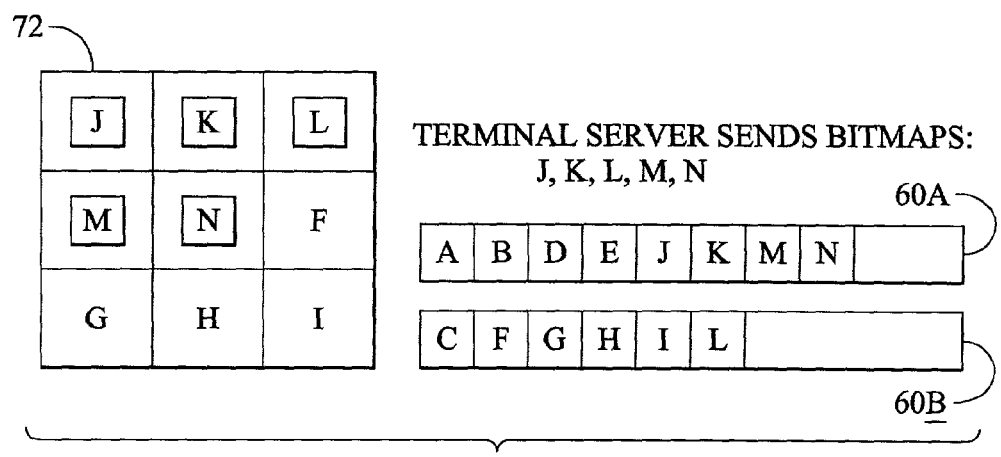
Figure 5C:
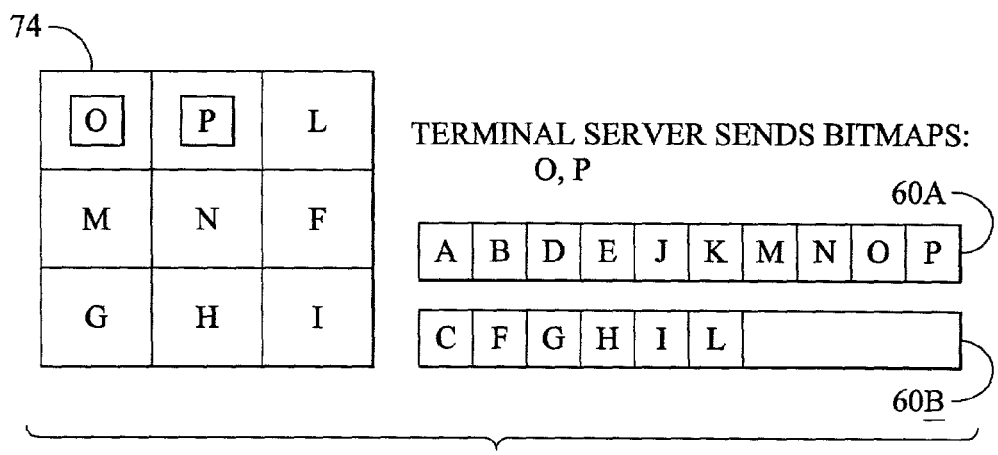

FIGS. 5A, 5B and 5C show an example of how caching works in a system using a thin client 10. Three frames are shown, 70, 72 and 74, each of which will be shown on the display 22 of the thin client 10 in succession as three frames of a video. In the beginning of this example, the cache 60 is empty. As seen in FIG. 5A, the frame 70 is made of bitmaps A–I. Because no data is stored in the cache 60 of the thin client 10, the server 30 must send all of the bitmaps A–I to the thin client through the communication pipeline 24 (FIG. 1). Once all of the data is received at the thin client 30, it is shown on its display 22, and all of the bitmaps A–I are stored in the cache 60. Cache 60A stores bitmaps A, B, D, and E, because they are the standard size 64×64, while cache 60B stores bitmaps C, F, G, H, and I.

FIG. 5B shows the second frame 72 to be shown. In that frame, the bitmaps A, B, C, D, and E have been replaced by bitmaps J, K, L, M, and N, (indicated by boxes) while the bitmaps F, G, H, and I are the same as in frame 70. Therefore, the server 30 need only send the full bitmaps J, K, L, M and N, and only sends addresses to where the bitmaps F, G, H, and I are located in the cache 60B in order to send the entire frame 72 of data. Sending the addresses of the bitmaps rather than the full bitmaps themselves greatly reduces the amount of bandwidth consumed on the connection pipeline 24 between the server 30 and the thin client 10.

FIG. 5C shows the third frame 74 to be shown. In that frame, the bitmaps J and K have been replaced by bitmaps O and P, while the other bitmaps in the third frame 74 (L, M, N, F, G, H, and I) can all be found in the caches 60A and 60B. Therefore, the server 30 need only send the full bitmaps O and P, and simply send the cache locations for the remaining bitmaps. It is important to note that the bitmaps need not be in the original locations that they were stored in the cache 60 to be used by another frame. For instance, if the bitmap A in frame 70 could later be used in frame 72 in a location other than where A was used in frame 70, that is acceptable, and the server need not send the data for bitmap A again, but only its address.

As can be appreciated, using a local caching strategy on the thin client 30 can greatly reduce the amount of data necessary to be sent by the server 30, but only if the portions of the images created by the bitmaps do not change from frame to frame.

Compressing Data Spatially Prior to Sending it to the Thin Client

Spatial compression, as described above, relates to compressing data based on other data in the same frame, bitmap, or other grouping. One way that some communication protocols for remote desktops (thin clients) use spatial compression is by compressing individual bitmaps. As noted in the preceding section, bitmaps are blocks of data that, when joined with other bitmaps, create a frame. Bitmaps can be any size, but typically a 64×64 block is used, if it will fit in the frame.

One way to compress bitmaps is to further break up the bitmaps by row. Then, each row is spatially compressed, if possible. Some standard compression techniques are as follows:

sending a special code if an entire row of a bitmap is white (i.e. all of the pixels in the row of the bitmap are white), or all black;

sending a color code describing an entire row of a single color, other than black or white;

sending codes describing an entire row made from only two colors; and comparing a current row with a previous row in the same bitmap and describing a current pixel in the current row by the corresponding pixel in the previous row, with or without using a binary mask; (note that this is not temporal compression (relating to time), because all of the pixels in the bitmap will be displayed at the same time in a frame. Rather, this method is still spatial compression because a current pixel is described by those around it.) Other methods of spatial compression are also known in the art.

If, after performing the compression on the row according to one of these methods, or others, the "compressed" data is actually larger than the raw data of the row would have been, the raw data is sent to the thin client 10 instead of the "compressed" data. That way, the server 30 always sends the minimum possible amount of data to the thin client 10 using the above spatial compression rules.

Sending the compressed data from the server 30 to the thin client 10 is similar to sending the non-compressed data, discussed above. As in the above section, data is sent in bitmap portions. When sending an uncompressed bitmap, the server 30 sends a signal to the thin client 10 that it is beginning a bitmap, sends the bitmap data, then sends a signal that it has reached the end of the bitmap. The thin client 10 then stores the bitmap data in its cache 60. When sending a compressed bitmap, there is an extra step. The server 30 still sends a signal to the thin client 10 that it is beginning a bitmap, sends the compressed bitmap data, then sends a signal that it has reached the end of the bitmap. The extra step is performed by the thin client 10, which decompresses the compressed bitmap data after the thin client received it, and prior to storing it in its cache 60. When decompressing the compressed bitmap data it received, the thin client 10 simply applies the rules that created the compressed data in reverse, and forms the uncompressed bitmap data. Then, it stores the uncompressed bitmap data in its cache 60, awaiting instructions from the server 30 to display the data.

Compressing Data Temporally Prior to Sending it to the Thin Client

Unlike spatial compression, which only compresses data based on what is in the same bitmap or frame, temporal compression also adds a factor of time. One method of temporal compression involves, instead of sending two successive frames that are similar to one another, making a code that describes their differences to one another, and sending this "difference code" instead. Thus in one example, the server 30 sends the first frame, which is formed of bitmaps that have been spatially compressed, but not necessarily so, to the thin client 10. Then the thin client 10 decompresses the bitmaps (if compressed) and stores them it its cache 60. Next, the server 30 codes the differences between the frame already stored in the cache of the thin client 10 and the new frame and sends these coded differences to the thin client 10. The thin client 10 decodes the differences into the second frame for display, and also may store the second frame in its cache, depending on whether it was directed by the server 30 to do so.

Lossless Encoding

Embodiments of the invention can use lossless temporal encoding, such as by using techniques discussed below. Decompressing data that was encoded using a lossless encoding system makes an exact reproduction of what was encoded. In contrast, a lossy process of encoding—decoding cannot perfectly recreate the encrypted data, although the differences between the original and the recreated data may be unimportant, unperceivable, or acceptable. The lossy encoding process typically compresses the data more than a lossless process, but one tradeoff is that all of the original data cannot be exactly reproduced after decoding, no matter how powerful of a processor the receiver of the lossy data has. Lossy processes are sometimes used when the transmission channel is very limited, or when exact reproduction of the original data is not necessary.

Figure 6A:
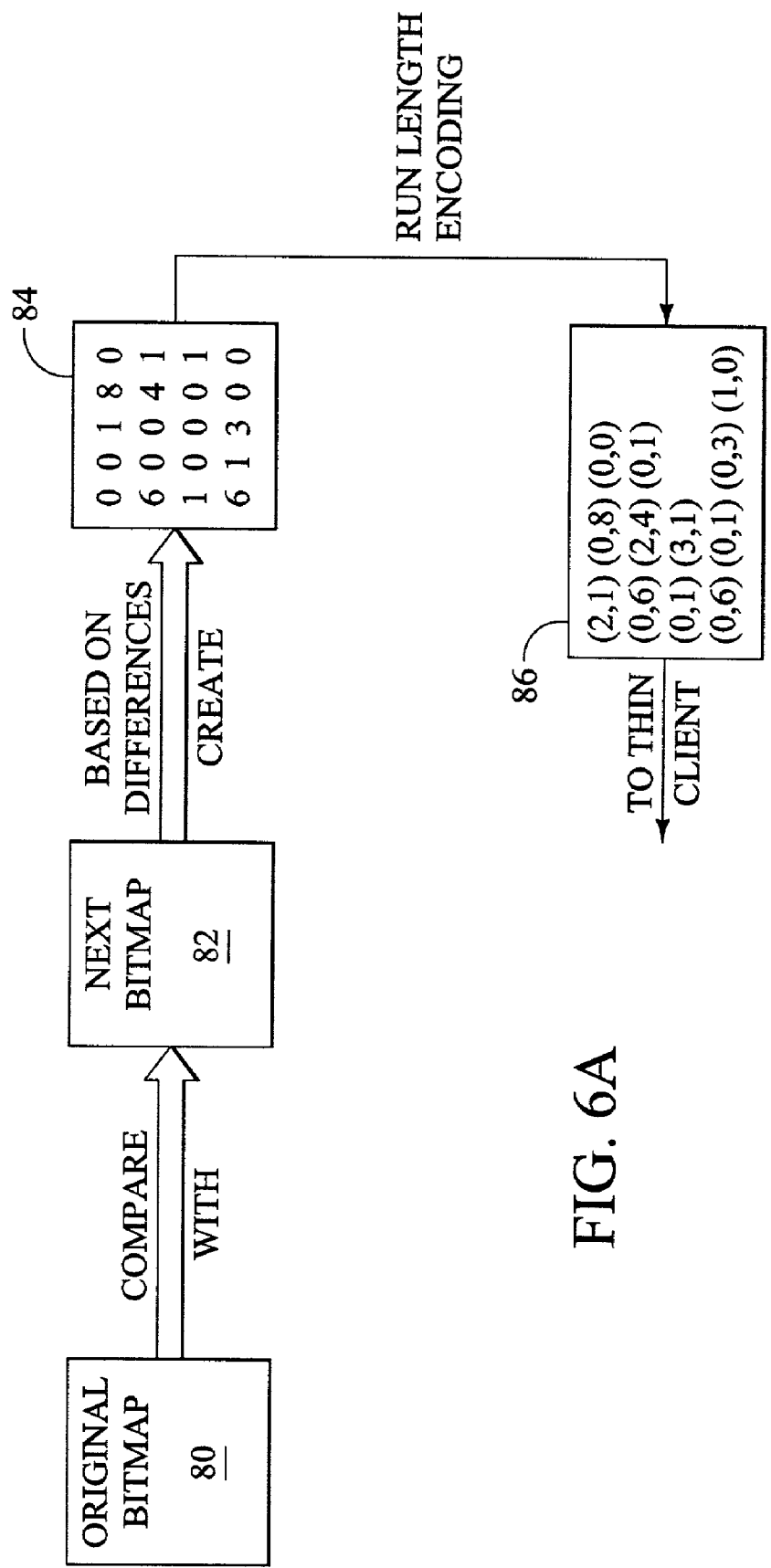
FIGS. 6A and 6B are block flow diagrams showing a temporal compression and decompression scheme according to an embodiment of the invention.

FIG. 6A shows an overview example of a temporal compression system in a remote data protocol environment. In that figure, an original bitmap 80 is present. The original bitmap 80 is compared to a second bitmap 82, and a difference map 84 is created based on the differences between the two bitmaps 80, 82. These differences are then encoded, or otherwise compressed into a difference table 86, which is sent to the thin client 10 for processing.

Figure 6B:
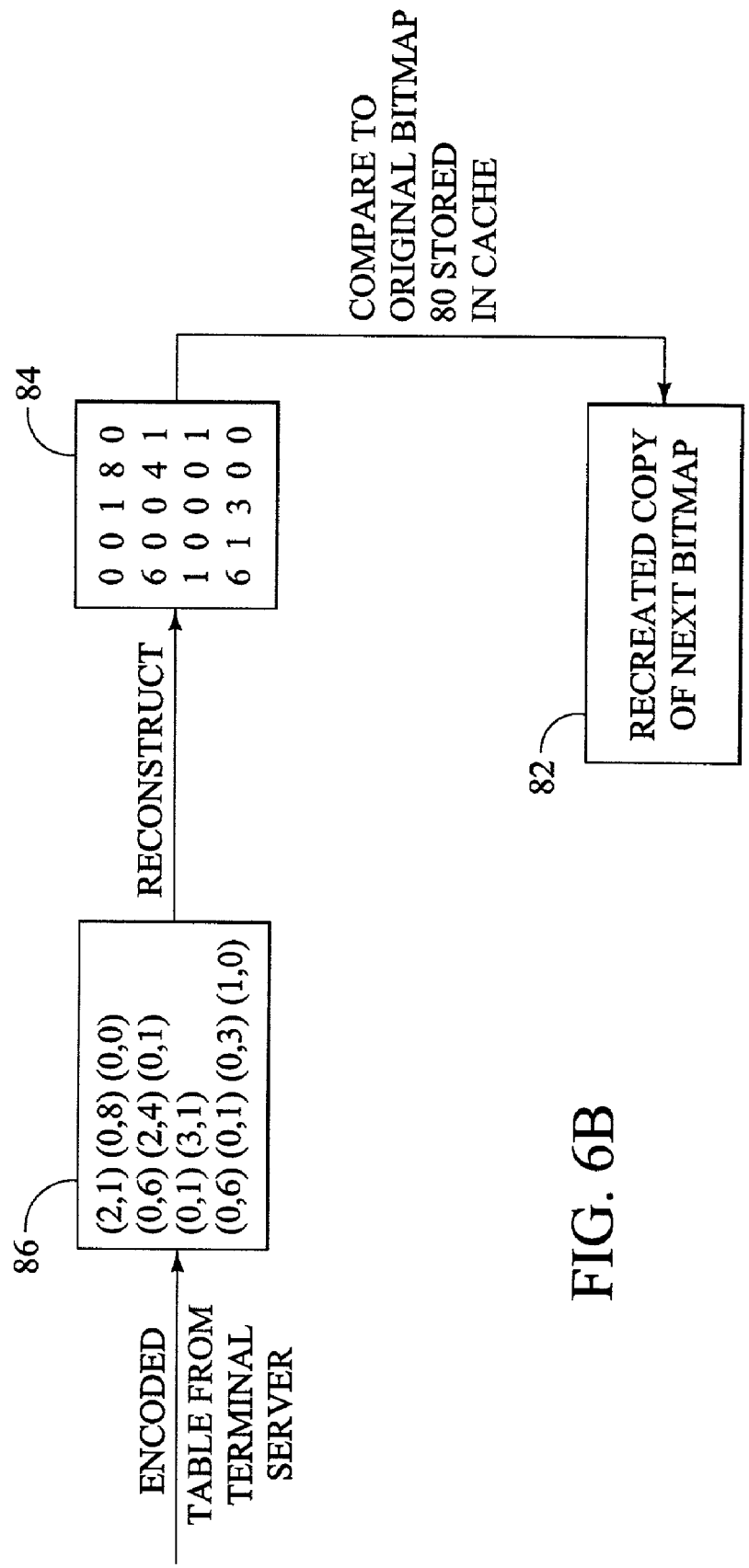

FIG. 6B shows an overview example of temporal decompression by the thin client 10 after it receives the difference table 86 from the server 30. First, the thin client 10 creates the difference map 84 by decoding the difference table 86 according to the pre-set decompression rules, which are the compression rules run in reverse order. Next the difference map is applied to the original bitmap 80, which was stored in the cache 60 of the thin client 10. Applying the differences from the difference map 84 to the original bitmap 80 recreates the second bitmap 82, which is ready to be stored in the cache 60, or shown on the display 22 (FIG. 1), or both, according to the directions of the server 30.

Returning back to the lossless compression shown in FIG. 6A, the difference map 84 can be created in many different ways. One method is to perform a bit-wise XOR process between both of the pixels that have the same location in each of the two bitmaps 80, 82. As shown in FIG. 6A, the original bitmap 80 and the second bitmap 82 have the exact same number of pixels. The bitmaps 80 and 82 may be the standard size of 64×64 pixels, or they may be some other size. Regardless of what size the bitmaps are, the two bitmaps 80, 82 will be the same size.

A bit-wise XOR process examines each bit making up the pixel for each of the two bitmaps 80, 82, and indicates whether the bit has changed from one bitmap to the next. The truth table for an XOR is reproduced in Table A.

TABLE A

XOR truth table

| Input 1 | Input 2 | Output |
|---------|---------|--------|
| 0 | 0 | 0 |
| 0 | 1 | 1 |
| 1 | 0 | 1 |
| 1 | 1 | 0 |

Thus, it is apparent why the XOR function is helpful in creating a difference map, because when the old bit (input 1) and the new bit (input 2) are the same, the XOR function outputs 0 (indicating no change), while if the old and new bits are different, the XOR function outputs 1 (indicating that the bit has changed).

For example, if the first pixel in the original bitmap 80 is a decimal "78" (hexidecimal "8E", binary 0100 1110) and the first pixel in the second bitmap 82 is a decimal "73" (hexidecimal "89", binary 0100 1001), then a bit-wise XOR would produce the following difference:

0100 1110
0100 1001
XOR: 0000 0111

Thus, a decimal "7" is stored as the first bit of the difference map 84. Note that the bitwise XOR process is not a subtraction, but merely indicates which bits have charged from one bit to the next. If instead both of the pixels were exactly the same number in every bit, a decimal "0" would be stored in the difference map for the first pixel. Each pixel is examined one-by-one until all of the pixels in each of the original and second bitmaps 80, 82 has been examined, and the difference map 84 is created based on those differences.

Figure 7:
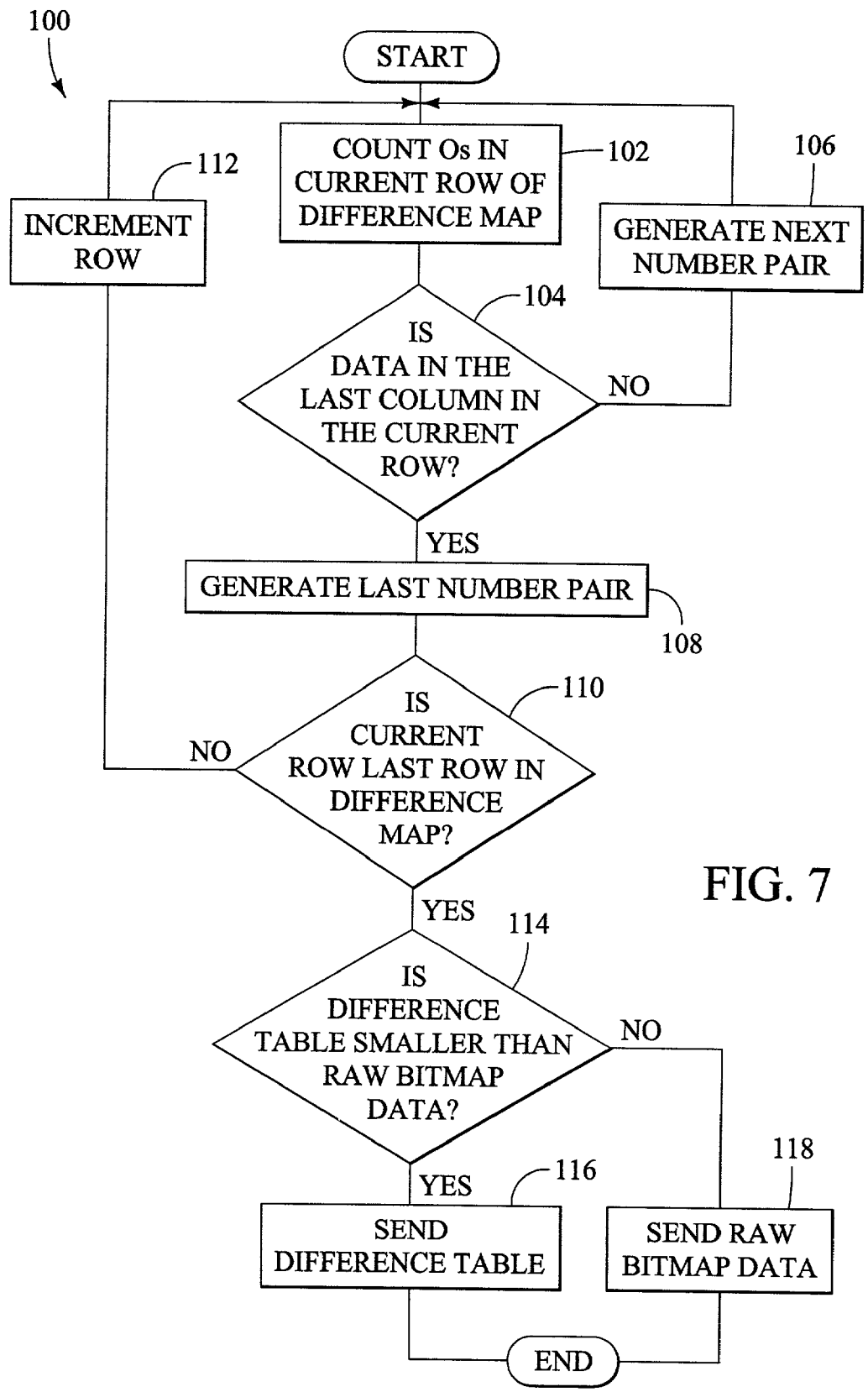
FIG. 7 is a flow diagram showing steps used in one way to implement the compression scheme shown in FIG. 6A.

Once the difference map 84 is created, it can be coded into a difference table such as the difference table 86. FIG. 7 is a flow diagram that shows how a process 100 encodes a difference map, such as the map 84 of FIGS. 6A and 6B into a difference table, such as the difference table 86 of the same figures. The process 100 begins at step 102 by examining the first row of the difference map 84 to count the number of successive 0's, beginning with the first column in the row. Any number could be chosen to count; for instance, the process 100 could count the number of successive 1s, or 2s or 3s, etc. in the row of the difference map 84. But because typically the number that will appear most frequently in the difference map 84 will be 0s, the biggest space savings will be gained from encoding the number of 0s. The reason that most of the numbers in the difference map 84 are 0s is because successive bitmaps (one frame to the next) generally do not change much. Recall that a new frame typically appears 30 times per second. Analysis shows that approximately 70 –80% of the bitmaps in a frame do not change, and their corresponding comparison in the difference map 84 will be 0s. Therefore the largest amount of compression is usually gained from encoding the number of 0s, and not some other number.

Step 102 continues examining the row until it reaches a non-zero number, and then checks to see if it has reached the end of the row in step 104. Or, if the first number in the current row is a non-zero number, the process 100 also moves to step 104, which determines if the last column of the row has been reached. If not, step 106 generates a number pair.

The first number of the number pair generated in step 106 indicates the number of successive 0's just found in step 102, which may in fact be 0 if the row starts with a non-zero number, or if there are two non-zero numbers back to back in the row. The second number in the generated number pair is the actual, next, non-zero number. For example, if the first row begins with "0 0 0 4 . . . ", the first generated pair would be (3,4), to indicate that there were three successive 0s, followed by the number 4. If instead the first row began with "5 7 . . . ", the first two generated pairs would be (0,5) (0,7), indicating that there were no 0s, then there was a "5", then there were no 0s again, then there was a "7." In this second example, the process 100 would have looped through steps 102–106 twice, making a single number pair each time step 106 was reached. The process 100 continues looping through steps 102–106 and generating pairs until each column in the current row of the difference map 84 has been examined.

Once the last column of data has been reached for the current row (i.e., when the process 100 exits decision block 104 with a YES), the process 100 generates the last pair for that row in step 108. Step 108 is a special case because of the situation when the last column ends in a 0. When the last column does not end in a zero, the final pair is generated just as before, with a count of zeros as the first number, and the actual last number in the bitmap row as the final number in the number pair. When the last column does end in zero, however, the number pair generated in step 108 must be modified somewhat. Because the thin client 10 always expects pairs of data when receiving the difference table 86, the process 100 must always ensure that the last pair has two numbers in it. Therefore, if the last number of the row is a zero, step 108 generates a pair of numbers where the first number is actually one less than the total amount of zeros in the run, and the second number contains a zero. For example, if the row ends with ". . . 0 0 0 0 3", the last generated pair would be (4, 3), as normal, but if the row ends with ". . . 0 0 0 0 0", the last generated pair would be (4,0), in order to ensure that the last pair always contains two numbers. As a further example, if the row ends with ". . . 0 0 0 3 3", the last two generated pairs would be (3,3) (0,3), to indicate there were three 0's followed by a "3", then there were no 0s, followed by another "3". In this example, the penultimate number pair would have been generated in step 106, and the last number pair would have been generated in step 108.

Once the number pairs for the current row are encoded in steps 102–108, step 110 checks to see if the last row of the difference map 84 has been reached. If not, the process 100 moves to the next row of the difference map in step 112, and the process is repeated for that row as above. When the last row of the difference map 84 is reached and the entire difference map has been encoded into the difference table 86, step 114 performs a final check to ensure that the encoded difference table is in fact smaller than the raw bitmap data itself. If the encoded difference table 86 is smaller, step 116 sends the encoded difference table to the thin client 10 in step 116. But if the raw data of the bitmap is smaller than the encoded difference table 86, then the raw data is sent to the thin client in step 116. This ensures that the smallest amount of data is sent over the communication pipeline 24.

Figure 8:
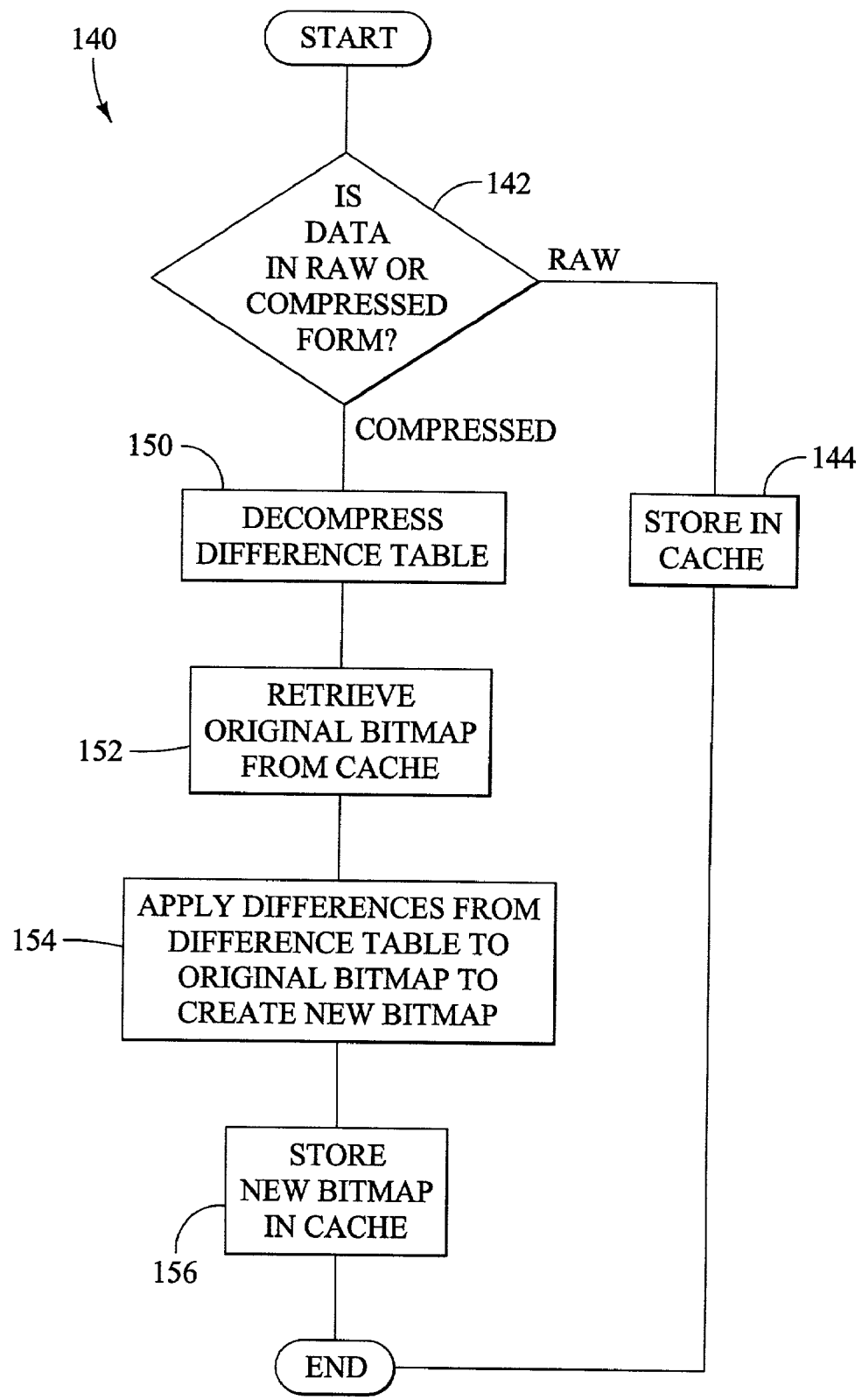
FIG. 8 is a flow diagram showing steps used in one way to implement the decompression scheme shown in FIG. 6B.

FIG. 8 shows an example process 140 of the steps the thin client 10 takes to recreate the temporally compressed and encoded bitmap data that the server 30 sends to it. First, in step 142, the thin client 10 determines if the data sent to it is the set of number pairs sent to it by step 116 in FIG. 7, or raw bitmap data sent to it in step 118 of FIG. 7. If the data is the raw bitmap data, step 144 simply stores the bitmap in the cache 60 of the thin client 10 and the thin client awaits further instructions. If instead the data is the set of number pairs, the pairs are reconstructed to recreate the difference map 84, in step 150. This step would include generating the strings of zeros that were encoded, and adding the other difference numbers that were used to create the number pairs.

The original bitmap 80, from which the difference map 84 was generated in the process 100 of FIG. 7, is retrieved from the cache 60 in step 152. Step 154 applies the differences from the difference map 84 to the original bitmap 80 in order to re-create the new bitmap 82. Once the new bitmap 82 is re-created, step 156 stores it in the cache 60 of the thin client 10.

The above example shown in FIGS. 6, 7 and 8 is only one of many ways to temporally compress frame data prior to sending it to the thin client 10. For instance, frames need not be compressed along bitmap boundaries, but may be compressed based on other groupings of pixels. Further, the encoding of the difference map 84 does not have to be limited to row data, but may include data from multiple rows, where appropriate. Also, instead of only comparing pixels in the same position in two different bitmaps, as shown above, pixels can be compared to other bitmaps that make up the frames of image data. Additionally, the bitmaps may be compared to one another to determine if the entire bitmap has been shifted within the frame, such as a panning motion. This coding is similar to a motion vector scheme. If the bitmap has been shifted, then the system could, instead of transmitting the new bitmap data, simply transmitting to the thin client 10 the new coordinates of where the old bitmap should be placed within the frame, and any additional changes. Such a scheme may involve too much processing overhead on both a server 30 for performing the compression and on a thin client 10 for performing the decompression, however, and the best implementation methods may need to be determined empirically.

Other methods of temporal compression could also be used in this system, such as one of the Lempel-Ziv (LZ) variants, such as LZ-77, or other methods, although typically these would require more computing power by the server 30 to compress the data and by the thin client 10 to decompress the data than the above-described methods.

Also, because many remote data protocol systems already include the spatial compression systems discussed in the sections above, those spatial compression systems may be able to be used on the difference map 84 directly. Implementation details, such as which temporal compression to use and how to specifically encode the changing image data, and other details, are all within the inventive spirit of the described invention.

Lossy Encoding

Instead of performing a lossless encoding of the difference map 84, a lossy encoding could be performed by the server 30. Lossy encoding is a scheme where data is encoded and compressed for transmission, but when the recipient of the encoded data decodes the encoded data, not all of the original data can be restored. One method to encode the difference map 84 using a lossy method is to make a transform, for instance a Discrete Cosine Transform (DCT) of the difference map, and then quantize the transformed map. The quantized map is then run-length encoded and transmitted to the thin client 10 over the communication channel 24. The thin client 10 performs the inverse operations to decode the data, but the decoded data will not necessarily be (and probably will not be) the same as the data that was used to create the encoding.

The quantization process controls the amount of how much data is lost in the lossy encoding, and can be structured to provide a reconstruction of the original data that is as close to the original data as is desired within the parameters of the system.

Compression Comparisons

Figure 9A:
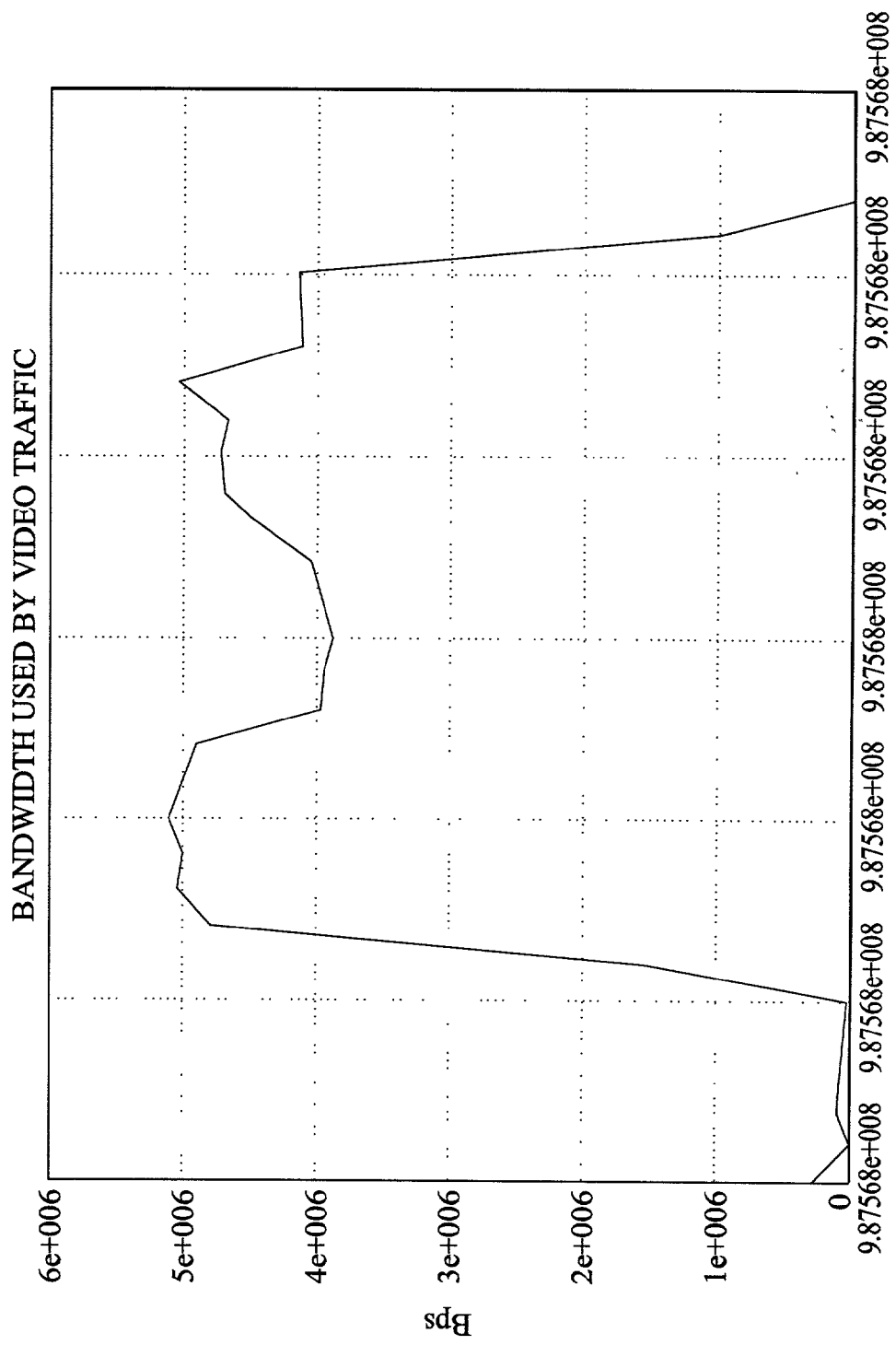
FIG. 9A is a graph showing bandwidth consumed by transmitting a film clip using only spatial compression.
Figure 9B:
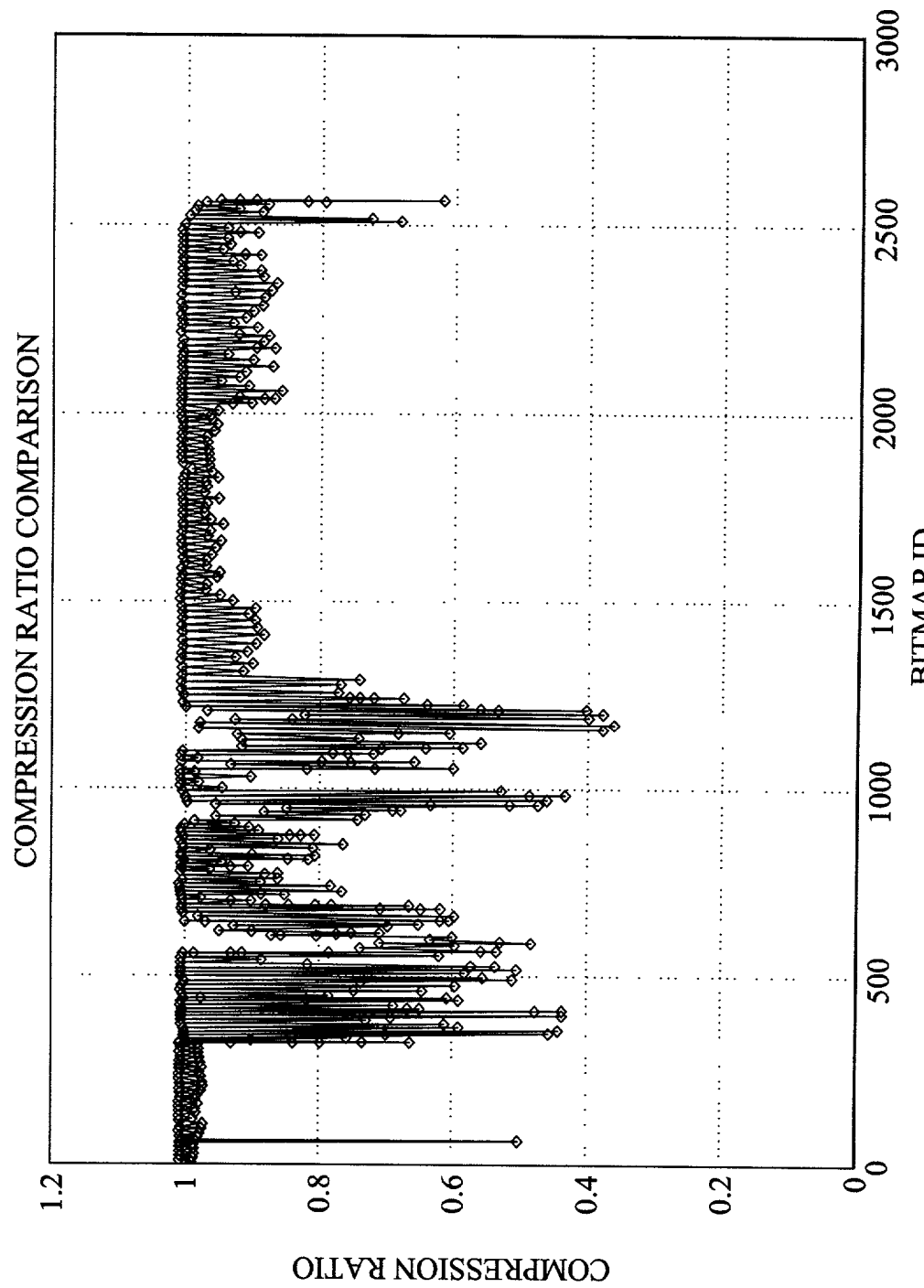
FIG. 9B is a graph showing a compression ratio achieved for the film clip of FIG. 9A by using spatial compression.

FIG. 9A is a graph of bandwidth consumed by sending frames of a video sequence from a short segment from the movie *Erin Brockovich* that was encoded using only spatial compression in a remote desktop protocol. Over the short time period for which data was collected, data is sent at a rate of between 4 and 5 Mbps, which is a large amount of data when sending over a network or other communication channel. FIG. 9B is a graph showing the instantaneous compression ratios using the spatial compression techniques. Using only the spatial compression techniques described above, the bitmaps were compressed to a ratio of 0.9319 of the raw video data, which would still require between 3.5 and 4.5 Mbps to transmit. User demand continues to drive the necessity for more video data, but existing communication channels cannot support the required demand, even when using spatially compressed techniques.

FIG. 9C is a graph of compression ratios achieved by both spatially and temporally compressing bitmaps for the same movie as in FIGS. 9A and 9B. Using both the spatial compression techniques describe above for bitmaps and the temporal compression techniques described with reference to FIGS. 6, 7 and 8, the video sequence can be compressed to a ratio of 0.4326 of its original, unencoded size. Additionally, unlike the compression as shown in FIG. 9B, the compression using both temporal and spatial techniques is much more evenly spaced. For instance, in FIG. 9B, compression ratios between the bitmap IDs 500 to 1300 often reach near 40%, but never reach that ratio after the bitmap ID 1500. Compare this with FIG. 9C that oftentimes achieves ratios nearing 5% throughout the entire range of bitmap IDs. Although not indicated on the graph, combining even more techniques allows additional compression to be achieved. When, in addition to the spatial and temporal techniques described above, an additional spatial compression is performed on the difference map 84 of FIG. 6A, the video bitmaps can be compressed to a ratio of 0.3646 of the original size. Further, and also not shown in FIG. 9C, if the LZ-77 compression method is used on the difference map 84 for this movie clip, the bitmaps making this video can be compressed to a space of 0.3373 of their original uncompressed size. Thus three times the original amount of video data can be sent in the same space required to send the original non-compressed video data.

The above-described system implementation can be implemented in a variety of ways, while keeping within the scope of the invention. For instance, the server 30 can use any compression technique and any method to create the compressed data to send to the thin clients 10. These compressions can occur in hardware or software, or a mix of the two. The server 30 may have a dedicated compression system, or it can operate as functions or applications running on its main processor 12. Compressed data may be locally stored on the server 30, or other location, after it is created and before it is sent to the thin client.

For the sake of convenience, the operations are described as various interconnected functional blocks or distinct operations. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention could be modified in arrangement and detail without departing from such principles. Claim is made to all modifications and variation coming within the spirit and scope of the following claims.

What is claimed is:

1. A system for transmitting data, comprising:
   a server operable to generate user data for use at a client station;
   a spatial compressor component of the server that is operable to inspect the user data and generate spatially compressed data therefrom;
   a temporal compressor component of the server that is operable to inspect the user data and generate temporally compressed data therefrom;
   a client station coupled to the server by a first communication link and structured to receive the spatially compressed data and the temporally compressed data, where the server and the client station communicate to one another over the first communication link using a remote desktop communication protocol;
   a decoder component of the client station that is operable to transform the spatially compressed data and the temporally compressed data into a frame portion; and
   an image generator structured to generate an image from the frame portion and show the image in a form for use by a user of the client station;
   a data server responsive to commands from the client station, coupled to the server through a second communication link, the server and the data server communicating using a communication protocol other than the remote desktop communication protocol used by the server and the client station;
   where the temporal compressor is adapted to XOR a portion of the user data from a current frame with a portion of the user data having a same spatial location in a previous frame to generate a difference map if the portion of the user data from the previous frame is in cache;
   where the temporal compressor is adapted to generate a difference table by run length encoding each row of the difference map; and
   where if a last number of a row in the difference map to be run length encoded is a zero, for the last number pair in the difference table, a first number of the last number pair indicates one less than the number of zeros in a current run.

2. The system of claim 1,
   where the data server is structured to complete a functional task requested by the client station.

3. The system of claim 2,
   where the functional task is to display a video, and the data server is structured to stream a video clip to the server that communicates the video clip to the client station.

4. The system according to claim 1 where the data server is a video server.

5. The system according to claim 1, further comprising one or more additional client stations each of which is coupled to the server and structured to receive the spatially compressed data and the temporally compressed data.

6. The system according to claim 1 where the frame portion is a bitmap.

7. The system according to claim 1 where the frame portion is one frame of a video.

8. The system according to claim 1
where the user data comprises data that is for the use of the client station at a first and a second time and
where the temporal compressor is structured to perform the XOR operation using data for the use of the client station at the first and the second time as inputs, and produce the difference map.

9. The system according to claim 1
where the difference table comprises one or more number pairs;
where a first number of the number pair indicates the number of zeros in a current run and
where a second number of the number pair indicates a symbol following the last zero in the current run.

10. The system according to claim 1 where the temporal compressor creates a lossless temporal encoding of the user data.

11. The system according to claim 1, further comprising a comparison component of the server that is operable to examine the user data, the spatially compressed data, and the temporally compressed data, and to select any combination therefrom to transmit to the client station.

12. The system according to claim 11 wherein the comparison component is structured to select the smallest combination or sub-combination of the user data, the spatially compressed data, and the temporally compressed data prior to transmitting it to the client station.

13. A system for transmitting data, comprising:
a server running an application program for generating multimedia data;
a data compressor structured to accept the multimedia data at an input and produce spatially and temporally compressed multimedia data at an output;
a thin client coupled to the server by a communication link and structured to receive the spatially and temporally compressed multimedia data; and
an image generator structured to generate a multimedia image from the spatially and temporally compressed multimedia data received by the thin client;
a data server responsive to commands from the client station, coupled to the server through a second communication link, the server and the data server structured to communicate using a communication protocol other than that used by the server and the client station;
where the data compressor is adapted to XOR a portion of the user data from a current frame with a portion of the user data having a same spatial location in a previous frame to generate a difference map if the portion of the user data from the previous frame is in cache;
where the data compressor is adapted to generate a difference table by run length encoding each row of the difference map; and
where, if a last number of a row in the difference map to be run length encoded is a zero, for the last number pair in the difference table, a first number of the last number pair indicates one less than the number of zeros in a current run.

14. The system according to claim 13 where the data server is a video server.

15. The system according to claim 13, further comprising one or more additional thin clients each of which is coupled to the server and structured to receive the spatially and temporally compressed multimedia data.

16. The system according to claim 13
where the multimedia data comprises data that is for the use of the thin client at a first and a second time; and
where the data compressor is structured to perform an XOR operation using data for the use of the thin client at the first and the second time as inputs, and produce a difference map.

17. The system according to claim 13
where the difference table comprises one or more number pairs;
where a first number of the number pair indicates the number of zeros in a current run; and
where a second number of the number pair indicates a symbol following the last zero in the current run.

18. A method of transferring data in a system including a server coupled to a thin client, the method comprising:
on the server:
establishing a first communication link between the server and the data server that uses a first communication protocol to supply multimedia data;
generating the multimedia data;
compressing the multimedia data spatially to make spatially compressed multimedia data;
determining if a portion of the user data from a current frame is stored in cache;
generating a difference map by temporally compressing the spatially compressed multimedia data by XOR-ing the portion of the user data from the current frame with a portion of the user data having a same spatial location in a previous frame responsive to the determining;
generating a difference table by run length encoding each row of the difference map;
transmitting the difference table to the thin client using a second communication link distinct from the first communication link that uses a second communication protocol different than the first communication protocol; and
encoding a plurality of difference codes;
on the thin client:
receiving the difference table from the server;
de-compressing the difference table into useable data;
presenting the useable data on the thin client;
where compressing the multimedia data comprises performing an XOR operation on data that is scheduled to be presented on the thin client at different times, the XOR operation creating the difference output;
where encoding a plurality of difference codes comprises generating one or more number pairs; and
where if a last number of a row in the difference codes to be run length encoded is zero, for the last number pair in the difference table, a first number of a last number pair indicates one less than the number of zeros in a current run.

19. The method of claim 18, further comprising storing the useable data in a cache on the thin client.

20. The method of claim 18 where presenting the useable data on the thin client comprises generating an image on a display screen.

21. The method of claim 18 where presenting the useable data on the thin client comprises showing a video clip on a display coupled to the thin client.

22. The method of claim 21 where showing a video clip comprises showing a series of frames on the display.

23. The method of claim 21 where generating the multimedia data comprises:
establishing the communication link;
retrieving video data from the data server; and
converting the video data to display data.

24. The method of claim 18 where a plurality of thin clients are coupled to the server, the method further comprising transmitting the difference table to the plurality of the thin clients coupled to the server.

25. The method of claim 24 where transmitting the difference table to the plurality of the thin clients comprises transmitting the difference table to the plurality of thin clients simultaneously.

26. The method of claim 18 where de-compressing the difference table comprises creating bitmaps of data.

27. The method of claim 18 where compressing the difference table comprises lossless data compression of the multimedia data.

28. The method of claim 18
where encoding a plurality of difference codes comprises generating one or more number pairs;
where a first number of the number pair indicates the number of zeros in a current run; and
where a second number of the number pair indicates a symbol following the last zero in the current run.

29. The method according to claim 18 where compressing the multimedia spatially and temporally comprises:
performing a procedure on the multimedia data intended to compress the multimedia spatially; and
determining if the first procedure created a result smaller than the multimedia data.

30. The method according to claim 18 compressing the multimedia spatially and temporally comprises:
performing a procedure on the multimedia data intended to compress the multimedia temporally; and
determining if the procedure created a result smaller than the multimedia data.

31. The system of claim 1 where the client station includes the cache, and the server is adapted to store the user data from the previous frame to compare with the user data from the current frame to produce a coded difference, and to send the coded difference to the client station.

32. The system of claim 1 where the temporal compressor is adapted to indicate to the server that it should transmit the difference map to the client station if the difference map is smaller than the portion of the user data from the current frame.

33. The system of claim 13 where the cache is included in the thin client, and the server is adapted to store the user data from the previous frame to compare with the user data from the current frame to produce a coded difference, and to send the coded difference to the thin client.

34. The system of claim 13 where the temporal compressor is adapted to indicate to the server that it should transmit the difference map to the client station if the difference map is smaller than the portion of the user data from the current frame.

35. The method of claim 18 where determining if the portion of the user data from a current frame is stored in the cache includes determining if the portion of the user data from a current frame is stored in the cache on the thin client by keeping track of the cache contents of the thin client cache.

36. The method of claim 18 where transmitting the difference table to the thin client occurs responsive to a determination that the difference table is smaller than the multimedia data.

* * * * *